2 Sheets—Sheet 1.

A. WALRATH & E. D. BRONSON.

BROOM-MACHINE.

No. 7,175. Reissued June 13, 1876.

WITNESSES

Robert Everett

E. H. Bates

INVENTORS.

Alphonso Walrath.

Edward D. Bronson.

Gilmore, Smith & Co.

ATTORNEYS.

N. PETERS, PHOTO-LITHOGRAPHER, WASHINGTON, D. C.

A. WALRATH & E. D. BRONSON.

BROOM-MACHINE.

No. 7,175. Reissued June 13, 1876.

WITNESSES

Robert Everett

E. H. Bates

INVENTORS.

Alphonso Walrath.

Edward D. Bronson.

Gilmore & Smith & Co.

ATTORNEYS

N. PETERS, PHOTO-LITHOGRAPHER, WASHINGTON, D. C.

UNITED STATES PATENT OFFICE.

ALPHONSO WALRATH AND EDWARD D. BRONSON, OF AMSTERDAM, NEW YORK.

IMPROVEMENT IN BROOM-MACHINES.

Specification forming part of Letters Patent No. 174,038, dated February 22, 1876; reissue No. 7,175, dated June 13, 1876; application filed June 5, 1876.

*To all whom it may concern:*

Be it known that we, ALPHONSO WALRATH and EDWARD D. BRONSON, of Amsterdam, Montgomery county, and State of New York, have invented new and useful Improvements in Broom-Machines; and we do hereby declare that the following is a full, clear, and exact description of the construction and operation of the same, reference being had to the annexed drawings, making a part of this specification, and to the letters and figures of reference marked thereon.

Figure 1:
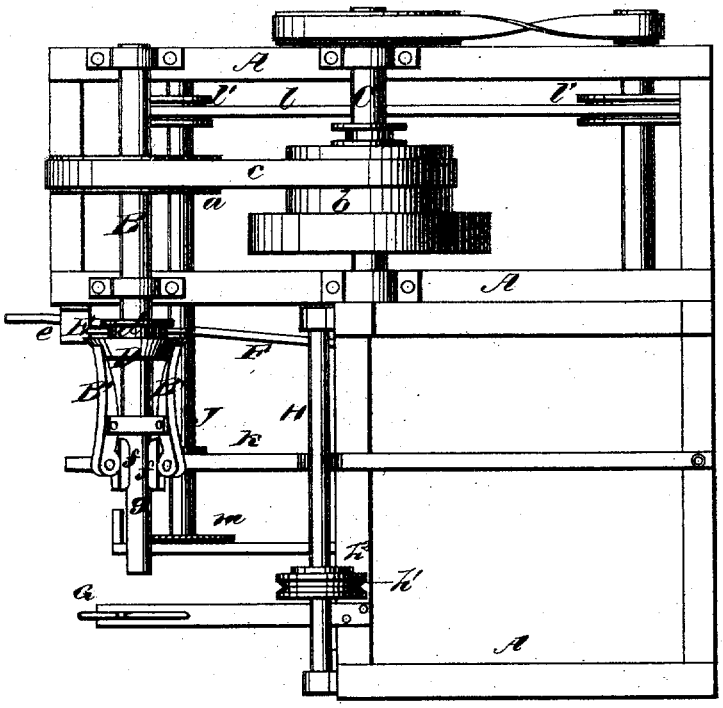
Figure 3:
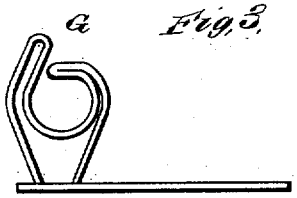
Figure 2:
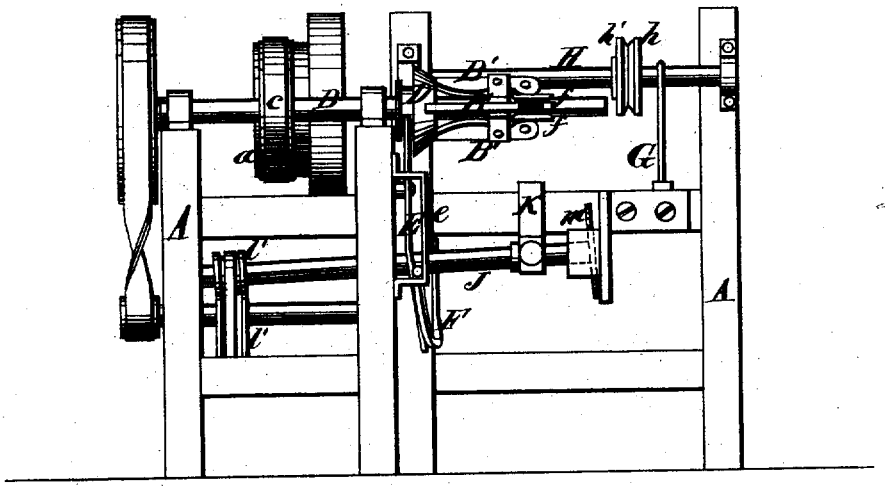
Figure 4:
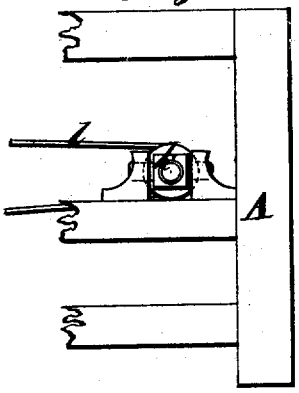
Figure 6:
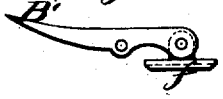
Figure 5:
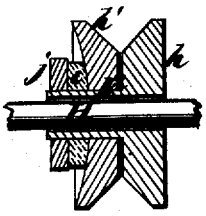
Figure 7:
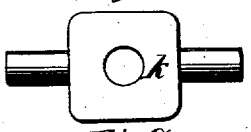
Figure 8:
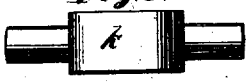

Figure 1 of the drawings is a representation of a plan view of our broom-machine, and Fig. 2 is an end view thereof. Figs. 3, 4, 5, 6, 7, and 8 are detail views.

This invention relates to machinery which is designed for the manufacture of brooms; and the nature of our invention consists in a rotating cutter in combination with a rotary broom-holder; also, in the combination of a broom-holder, clamping-levers, and rotating cutter; also, in a peculiarly-shaped holder for confining the broom-corn during the forming of the broom; and, finally, in auxiliary devices hereinafter particularly described.

In the accompanying drawings, A designates the frame of the improved machine, and B a hollow mandrel, which latter is sustained in a horizontal position at the front part of the frame. This hollow mandrel receives rotary motion from a driving-shaft, C, by means of pulleys *a b* and a belt, *c*. D designates a circular conical slide, which is applied on the mandrel B, and formed with an annular groove, *d*, which is embraced by the bifurcated end of a lever, E, pivoted to one side of the frame A, so that it can be acted upon by a hand-lever, F, which passes through a long staple, *e*. To one end of the hollow mandrel B clamping-levers B′ are pivoted, which preferably have self-adjusting jaws *f* pivoted on the ends of their shorter arms. When the conical slide D is forced against the longer arms of the said clamping-levers B′, the shorter arms of said levers will firmly gripe and hold a broom-handle, *g*, in a proper position for fastening the broom-corn to it. G designates a device which is secured to a projecting bar of frame A, and which is used for holding the broom-corn while it is being fastened to the handle *g*. This device is constructed of wire, and is shaped somewhat like the letter C, with one limb extending above the other, for the purpose of catching and gathering in the broom-corn layers as they are successively applied on the handle. The wrapping wire or twine is taken from a spool, (not shown in the drawings,) and is passed between two disks, $h$ $h^1$, which have beveled peripheries. The disk $h$ is constructed with a hub, $h^2$, (shown in Fig. 5,) which is free to turn on a shaft, H, on which hub the disk $h^1$ is applied; also a rubber washer, *i*, and a nut, *j*. By adjusting the nut *j* any degree of tension can be applied to the wire. This is a very convenient device for holding the wire when broken off, either accidentally during the operation of winding a broom, or (intentionally) after the winding is completed. J designates a shaft, which is journaled at one end in a box, *k*, or other firm bearing, and at the other (the inner) end in a bearing, *k′*, on the lever K, by which arrangement the inner end of the shaft J may be made to vibrate with the lever K. Shaft J is rotated by means of a belt, *l*, passed around pulleys *l′ l′*. The inner or vibrating end of shaft J is provided with a cutter, *m*, which has either a knife-edge or a serrated edge, as preferred. After the broom-corn has been bound upon the handle, what is technically termed the "shoulder" is formed by bringing the cutter *m* in contact with the wrapped ends of the stalk or brush. To accomplish this the operator raises that end of lever K to which shaft J is connected. Any desired angle or bevel can be given to the shoulder by raising or depressing the journal-box *k*.

What we claim as new, and desire to secure by Letters Patent, is—

1. In a broom-winding machine, a rotating cutter for cutting the shoulders of the broom, in combination with a suitable rotary broom-holder, substantially as described.

2. In a broom-winding machine, a rotating cutter, *m*, situated on a movable shaft or support, in combination with a broom-holder, whereby the cutter may be brought at will against the broom-corn, substantially as and for the purpose set forth.

3. In a broom-winding machine, the C-shaped holder G, constructed substantially as described.

4. The combination of a hollow mandrel or broom-holder, B, clamping-levers B′, and rotating cutter *m*, substantially as and for the purpose set forth.

5. The disks *h* and $h^1$ and nut *j*, in combination with a suitable rotary broom-holder, substantially as and for the purpose set forth.

6. The combination of the rotating cutter-shaft J, cutter-lever K, and rotating broom-holder, substantially as and for the purpose set forth.

In testimony that we claim the above we have hereunto subscribed our names in the presence of two witnesses.

ALPHONSO WALRATH.
EDWARD D. BRONSON.

Witnesses as to ALPHONSO WALRATH:
J. GENTER,
M. POTTER.
Witnesses as to EDWARD D. BRONSON:
JOHN F. ACKER,
C. H. MCEWEN.